US008964256B2

(12) United States Patent
Viturro et al.

(10) Patent No.: US 8,964,256 B2
(45) Date of Patent: Feb. 24, 2015

(54) METHOD OF CORRECTING STREAKS USING EXPOSURE MODULATION AND SPATIALLY VARYING TRCS

(75) Inventors: R. Enrique Viturro, Rochester, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 750 days.

(21) Appl. No.: 12/112,618

(22) Filed: Apr. 30, 2008

(65) Prior Publication Data
US 2009/0273813 A1    Nov. 5, 2009

(51) Int. Cl.
| G06T 5/00 | (2006.01) |
| H04N 1/407 | (2006.01) |
| H04N 1/409 | (2006.01) |
| H04N 1/401 | (2006.01) |
| H04N 1/29 | (2006.01) |
| G03G 15/00 | (2006.01) |
| H04N 1/12 | (2006.01) |

(52) U.S. Cl.
CPC ............. *H04N 1/4015* (2013.01); *H04N 1/295* (2013.01); *H04N 1/4076* (2013.01); *G03G 15/5041* (2013.01); *G03G 2215/00042* (2013.01); *H04N 1/12* (2013.01)
USPC ............................ 358/3.26; 358/407; 358/440

(58) Field of Classification Search
USPC ........................................................ 358/3.26
See application file for complete search history.

(56) References Cited

U.S. PATENT DOCUMENTS

| 4,553,033 A | 11/1985 | Hubble, III et al. |
| 5,680,426 A * | 10/1997 | Ching-Ming ................. 378/8 |
| 5,749,020 A | 5/1998 | Mestha et al. |
| 5,963,244 A | 10/1999 | Mestha et al. |
| 6,021,285 A | 2/2000 | Mestha et al. |
| 6,636,628 B1 | 10/2003 | Wang et al. |
| 6,697,582 B1 * | 2/2004 | Scheuer ........................... 399/49 |
| 6,760,056 B2 | 7/2004 | Klassen et al. |
| 7,127,187 B2 * | 10/2006 | Mo et al. ......................... 399/49 |
| 7,236,711 B2 | 6/2007 | Burry et al. |
| 7,411,688 B1 * | 8/2008 | Zhai et al. ..................... 356/601 |
| 2005/0036705 A1 * | 2/2005 | Viassolo et al. .............. 382/275 |
| 2005/0099446 A1 * | 5/2005 | Mizes et al. .................... 347/19 |
| 2005/0134623 A1 * | 6/2005 | Mizes ............................. 347/19 |
| 2005/0134624 A1 | 6/2005 | Mizes |
| 2006/0001911 A1 * | 1/2006 | Viassolo et al. ............. 358/3.26 |
| 2006/0077488 A1 | 4/2006 | Zhang et al. |
| 2006/0209101 A1 | 9/2006 | Mizes |
| 2006/0245773 A1 * | 11/2006 | Gross et al. ..................... 399/49 |
| 2007/0139733 A1 * | 6/2007 | Mizes et al. .................. 358/504 |
| 2007/0140552 A1 | 6/2007 | Fan et al. |
| 2007/0165259 A1 | 7/2007 | Amorim |
| 2007/0201097 A1 * | 8/2007 | Anderson et al. ............ 358/3.06 |
| 2008/0075492 A1 * | 3/2008 | Mestha et al. .................. 399/49 |
| 2008/0239344 A1 * | 10/2008 | Wang et al. .................... 358/1.9 |

OTHER PUBLICATIONS

"Reference_comparison.pdf", Aug. 7, 2012.*

* cited by examiner

*Primary Examiner* — Marivelisse Santiago Cordero
*Assistant Examiner* — Daryl Jackson
(74) *Attorney, Agent, or Firm* — Fay Sharpe LLP

(57) ABSTRACT

Systems and methods are provided for compensating for streak defects in images formed by an image forming device, such as a digital printer. The systems and methods include using both modulation of a raster output scanner (ROS actuation) and spatially varying tone reproduction curve (STRC actuation) in a common control system for improving streak correction. Low spatial frequency large amplitude streak defects are corrected using ROS actuation and high spatial frequency streak defects, as well as any residual low frequency defects, are corrected using STRC actuation.

21 Claims, 14 Drawing Sheets

METHOD OF CORRECTING STREAKS USING EXPOSURE MODULATION AND SPATIALLY VARYING TRCS

CROSS REFERENCE TO RELATED PATENTS AND APPLICATIONS

U.S. patent application Ser. No. 11/702,238, by Wing et al., filed Feb. 5, 2007, entitled "PRINTING APPARATUS AND METHOD" is incorporated herein by reference in its entirety.

BACKGROUND

This disclosure relates to a printing machine and method. Specifically, the disclosed printing machine and method relate to scanning a P/R (Photoreceptor Belt) for image non-uniformities and controlling the printing process to reduce or correct the image non-uniformities. The present systems and methods relate to the field of digital imaging and, more particularly, to a system and method compensating for streaks and other image artifacts that appear on images which run parallel to the printer's process direction by using a combination of ROS actuation and spatially varying TRC actuation.

A typical electrophotographic, or xerographic, printing machine employs a photoreceptor, that is charged to a substantially uniform potential so as to sensitize the surface thereof. The charged portion of the photoreceptor is exposed to a light image of an original document being reproduced. Exposure of the charged photoreceptor selectively dissipates the charge thereon in the irradiated areas to record an electrostatic latent image on the photoreceptor corresponding to the image contained within the original document. The location of the electrical charge forming the latent image is usually optically controlled. More specifically, in a digital xerographic system, the formation of the latent image is controlled by a raster output scanning device, usually a laser or LED source.

After the electrostatic latent image is recorded on the photoreceptor, the latent image is developed by bringing a developer material into contact therewith. Generally, the electrostatic latent image is developed with dry developer material comprising carrier granules having toner particles adhering triboelectrically thereto. However, a liquid developer material may be used as well. The toner particles are attracted to the latent image, forming a visible powder image on the photoconductive surface. After the electrostatic latent image is developed with the toner particles, the toner powder image is transferred to a sheet, such as paper or other substrate sheets, using pressure and heat to fuse the toner image to the sheet to form a print.

Electrophotographic printing machines of this type can produce color prints using a plurality of stations. Each station has a charging device for charging the photoconductive surface, an exposing device for selectively illuminating the charged portions of the photoconductive surface to record an electrostatic latent image thereon, and a developer unit for developing the electrostatic latent image with toner particles. Each developer unit deposits different color toner particles on the respective electrostatic latent image. The images are developed, at least partially in superimposed registration with one another, to form a multi-color toner powder image. The resultant multi-color powder image is subsequently transferred to a sheet. The transferred multi-color image is then permanently fused to the sheet forming the color print.

Although these xerographic printing machines usually produce a faithful reproduction of the original image, defects in the subsystems of the xerographic system may give rise to cross-process non-uniformities, commonly referred to as streaks or streak defects, which can be a significant factor effecting the overall image quality of the print. Streaks are primarily one-dimensional visible defects in the image that run parallel to the process direction, also referred to as the slow-scan direction. In a uniform gray level patch, streaks may appear as a variation in the gray level. As used herein, "gray" refers to the optical density or area coverage value of any single color separation layer, whether the toner is black, cyan, magenta, yellow, or some other color. In a color xerographic machine, streaks in single color separations that may be unobjectionable can cause an undesirable visible color shift for overlaid colors.

Conventional printing technologies contain several sources of streaks which cannot be satisfactorily controlled via printer design or printing system optimization. Streaks can be caused by "non-ideal" responses of xerographic components in the marking engine. The source of these artifacts is found in toner adhered on the wires, in dirt on the charging elements, P/R streaks, fuser originated streaks, charge contamination, etc. Streaks can also be caused by non-uniformity of the raster output scanning device spot-size or intensity variations. As shown in FIG. 1, a measured L* profile, also known as a reflectance profile, of a single color test image generated by the image forming machine is shown. The reflectance profile is generated by measuring the reflectivity of the image in the cross-process direction. The measured reflectance profile illustrates streaks as undesired variations in cross-process L* in the test image. A desired reflectance profile would be flat.

Various control schemes have been used for correcting streaks in image forming machines. ROS actuation for streak correction has been used, as disclosed US Publication No. 2006/0001911 A1 for "Closed-loop compensation of streaks by ROS intensity variation" by Viassolo et al. The intensity of the illumination source of the raster output scanner is controlled as a function of the fast-scan position to compensate for streaks in the image.

Spatially varying tone reproduction curves (STRCs) have also been used to modify the input image "contone" ("continuous tone") data, to derive compensated gray levels to correct the spatial non-uniformities, such as is taught by US Publication No. 2006/0077488 A1 for "Methods and systems achieving print uniformity using reduced memory or computational requirements" by Yeqing, et al.

BRIEF DESCRIPTION

A system and method for compensating for streak defects in images formed by a digital printer having a photoreceptor and raster output scanner is provided.

The method includes developing test images on the photoreceptor, sensing the cross-process reflectance of the developed images on the photoreceptor, generating reflectance profile data of the test images using the sensed cross-process reflectance, generating both low frequency spatially varying corrections and high frequency spatially varying corrections from the measured reflectance profile data, using the low frequency correction for the raster output scanner (ROS) compensation parameter, using the high frequency correction for the spatially varying tone reproduction curve (STRC) actuator in the digital image, and then generating a streak-corrected image.

The system includes a scanner for sensing the cross-process reflectance of test images formed on the photoreceptor, and a controller for generating both the low frequency ROS compensation parameter table and the high frequency STRC for use in generating a streak-corrected image.

DETAILED DESCRIPTION

Exemplary embodiments shall be described for systems and methods of correcting non-uniformities, or streaks, in images formed by a xerographic image forming device in which low spatial frequency large amplitude defects are corrected using modulation of a raster output scanner, and high spatial frequency defects, as well as any residual low frequency defects are corrected using spatially varying tone reproduction curves.

Figure 4:
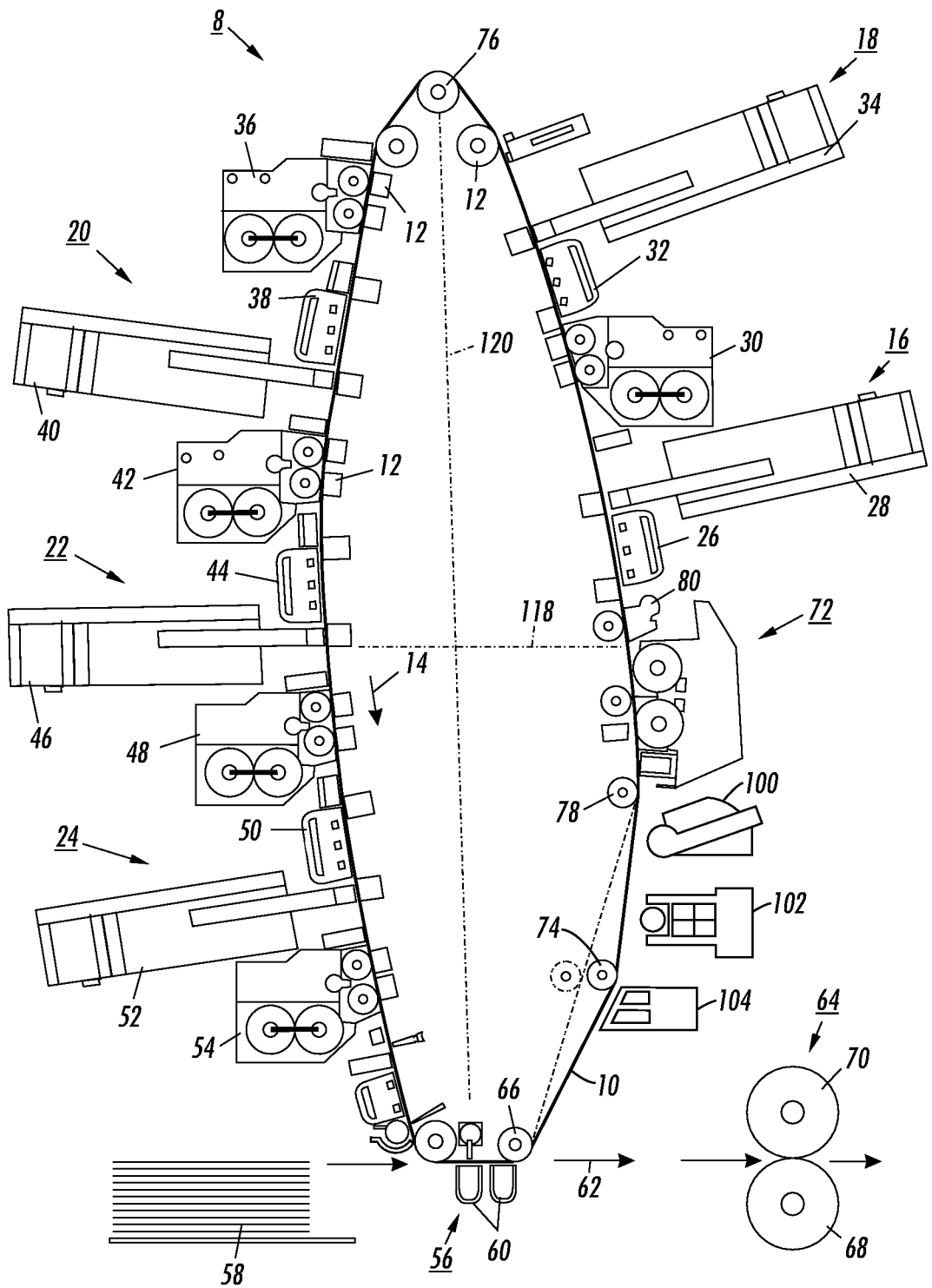
FIG. 4 illustrates a digital printer according to an exemplary embodiment of this disclosure.
Figure 5:
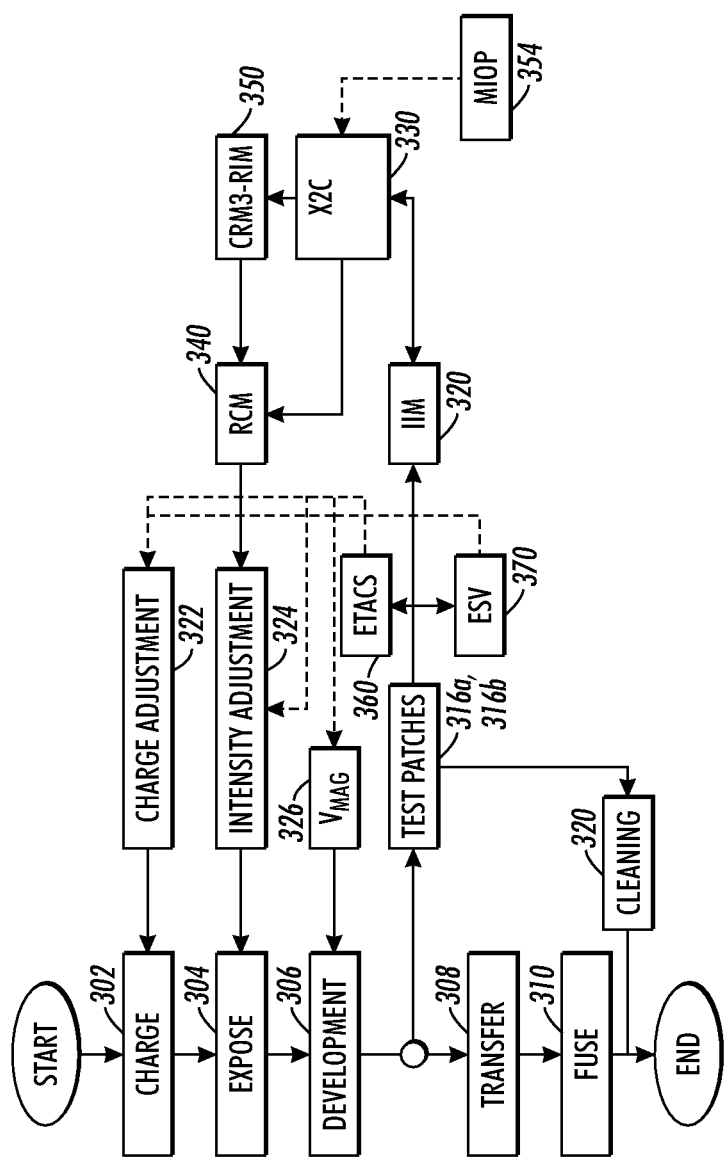
FIG. 5 illustrates a system for correcting streak defects according to an exemplary embodiment of this disclosure.

With reference to FIGS. 4 and 5, a printing machine is illustrated generally at 8 according to an exemplary embodiment of this disclosure. The printing machine 8 is a single pass multi-color digital printer, also known as a xerographic or electrophotographic image forming device. The digital printer 8 described herein is a Xerox iGen3™ Digital Production Press and is provided by way of example, it should be appreciated that the systems and methods for compensating for image streaks, described herein, are suitable for use in other image forming devices.

The digital printer 8 employs a photoconductive/photoreceptor (P/R) belt 10 supported by a plurality of baker rollers or baker bars 12. The P/R belt 10 is arranged in a vertical orientation. P/R belt 10 advances in the process direction shown by 14 to move successive portions of the external surface of P/R belt 10 sequentially beneath the various processing stations disposed about the path of movement thereof.

The printing machine architecture can include five image recording stations, indicated generally by the reference numerals 16, 18, 20, 22, and 24, respectively, each corresponding to a different color separation. Initially, belt 10 passes through image recording station 16. Image recording station 16 includes a charging device and an exposure device. The charging device includes a corona generator 26 that charges the exterior surface of P/R belt 10 to a relatively high, substantially uniform potential during a charging operation as shown at 302 in FIG. 5. After the exterior surface of P/R belt 10 is charged, the charged portion thereof advances to the exposure device. The exposure device includes a raster output scanner (ROS) 28, which illuminates the charged portion of the exterior surface of P/R belt 10 to record a first electrostatic latent image thereon during an exposure operation as shown at 304. Alternatively, a light emitting diode (LED) may be used as the illumination source in the ROS device.

This first electrostatic latent image is then developed by developer unit 30 during a development operation 306. Developer unit 30 deposits toner particles of a selected first color on the first electrostatic latent image. After the first color toner image has been developed on the exterior surface of P/R belt 10, belt 10 continues to advance in the process direction of arrow 14 to image recording station 18.

Image recording station 18 includes a charging device and an exposure device. The charging device includes a corona generator 32 which recharges the exterior surface of P/R belt 10 to a relatively high, substantially uniform potential during a charging operation 302. The exposure device includes a ROS 34 which illuminates the charged portion of the exterior surface of P/R belt 10 to selectively record a second electrostatic latent image thereon during an exposure operation 304. This second electrostatic latent image corresponds to the regions to be developed with second color toner particles, such as magenta toner particles. This second electrostatic latent image is now advanced to the next successive developer unit 36.

Developer unit 36 deposits magenta toner particles on the electrostatic latent image during a development operation 306. In this way, a magenta toner powder image is formed on the exterior surface of P/R belt 10. After the magenta toner powder image has been developed on the exterior surface of P/R belt 10, P/R belt 10 continues to advance in the process direction of arrow 14 to image recording stations 20, 22 and 24.

Image recording stations 20, 22 and 24 also include charging devices and exposure devices similar to those described above. The charging devices includes corona generators 38, 44 and 50 which recharge the photoconductive surface to a relatively high, substantially uniform potential during charging operations 302. The exposure devices also include ROS 40, 46 and 52 respectively, which illuminate the charged portion of the exterior surface of P/R belt 10, during exposure operations 304, to selectively dissipate the charge thereon for recording third, fourth and fifth electrostatic latent images corresponding to the regions to be developed with corresponding color toner particles, such as yellow, cyan and black toner particles, respectively.

The third, fourth or fifth electrostatic latent images are then advanced to their respective developer units 42, 48, or 54 which deposits yellow, cyan or black toner particles on the exterior surface of P/R belt 10, during development operations 306, to form toner powder images thereon thereby developing the third, fourth and fifth electrostatic latent images. These toner particles may be partially superimposed and registered with the previously formed powder images. The black toner particles may be totally superimposed and registered with the previously formed powder images.

In this way, a multi-color toner powder image is formed on the exterior surface of P/R belt 10. Thereafter, P/R belt 10 advances the multi-color toner powder image to a transfer station, indicated generally by the reference numeral 56 for the transfer operation 308.

At transfer station 56, a receiving medium, i.e., paper, is advanced from stack 58 by sheet feeders and guided to transfer station 56. At transfer station 56, a corona generating device 60 sprays ions onto the back side of the paper. This attracts the developed multi-color toner image from the exterior surface of P/R belt 10 to the sheet of paper. Stripping assist roller 66 contacts the interior surface of P/R belt 10 and provides a sufficiently sharp bend thereat so that the beam strength of the advancing paper strips from P/R belt 10. A vacuum transport moves the sheet of paper in the direction of arrow 62 to fusing station 64 for the fusing operation 310.

Fusing station 64 includes a heated fuser roller 70 and a backup roller 68. The back-up roller 68 is resiliently urged into engagement with the fuser roller 70 to form a nip through which the sheet of paper passes. In the fusing operation, the toner particles coalesce with one another and bond to the sheet in image configuration, forming a multi-color image thereon. After fusing, the finished sheet is discharged to a finishing station where the sheets are compiled and formed into sets which may be bound to one another. These sets are then advanced to a catch tray for subsequent removal therefrom by the printing machine operator.

One skilled in the art will appreciate that while the multi-color developed image has been disclosed as being transferred to paper, it may be transferred to an intermediate member, such as a belt or drum, and then subsequently transferred and fused to the paper. Furthermore, while toner powder images and toner particles have been disclosed herein, one skilled in the art will appreciate that a liquid developer material employing toner particles in a liquid carrier may also be used.

It has been found that the use of both ROS actuation and STRC actuation used in a common control system can improve streak correction in image forming machines more effectively than using either type of streak correction individually. Combining ROS actuation and STRC actuation streak compensation techniques can mitigate or eliminate image quality artifacts generated by the overextension of actuator latitude when using a single actuation source (ROS or STRC) alone, since these techniques both effect cross-process density variations in different ways as described below.

Figure 1:
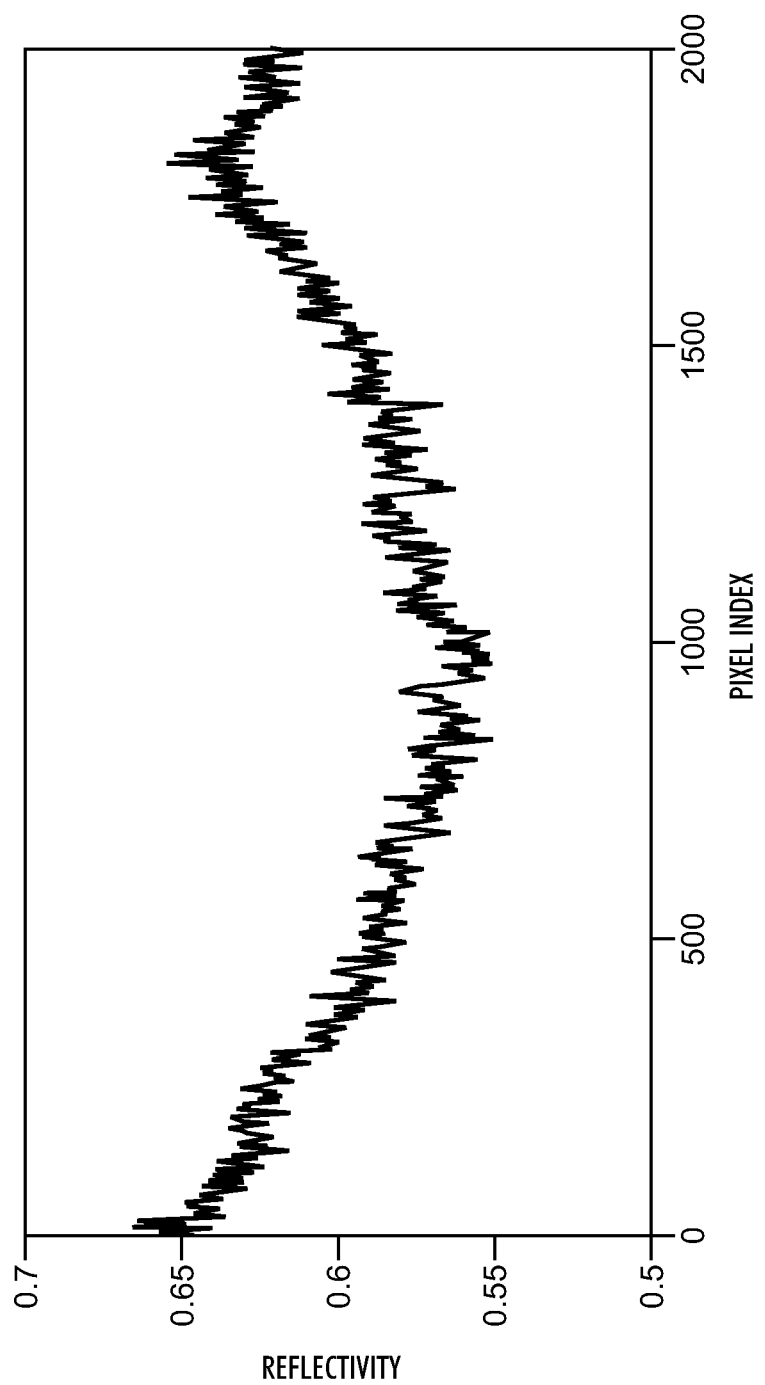
FIG. 1 illustrates an example of a measured luminance reflectance profile in a fast-scan direction for a single color separation.
Figure 2:
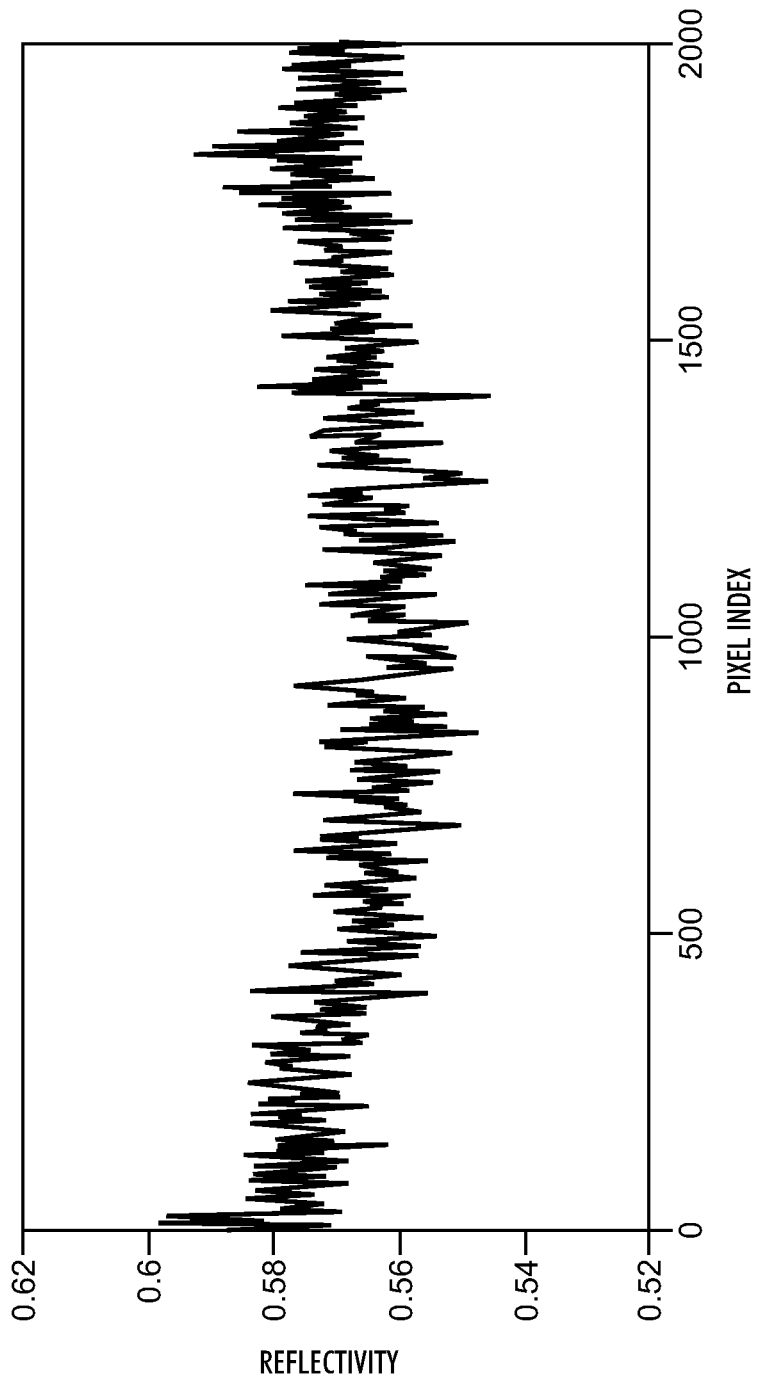
FIG. 2 illustrates the effect of ROS actuation on the profile of FIG. 1.
Figure 3:
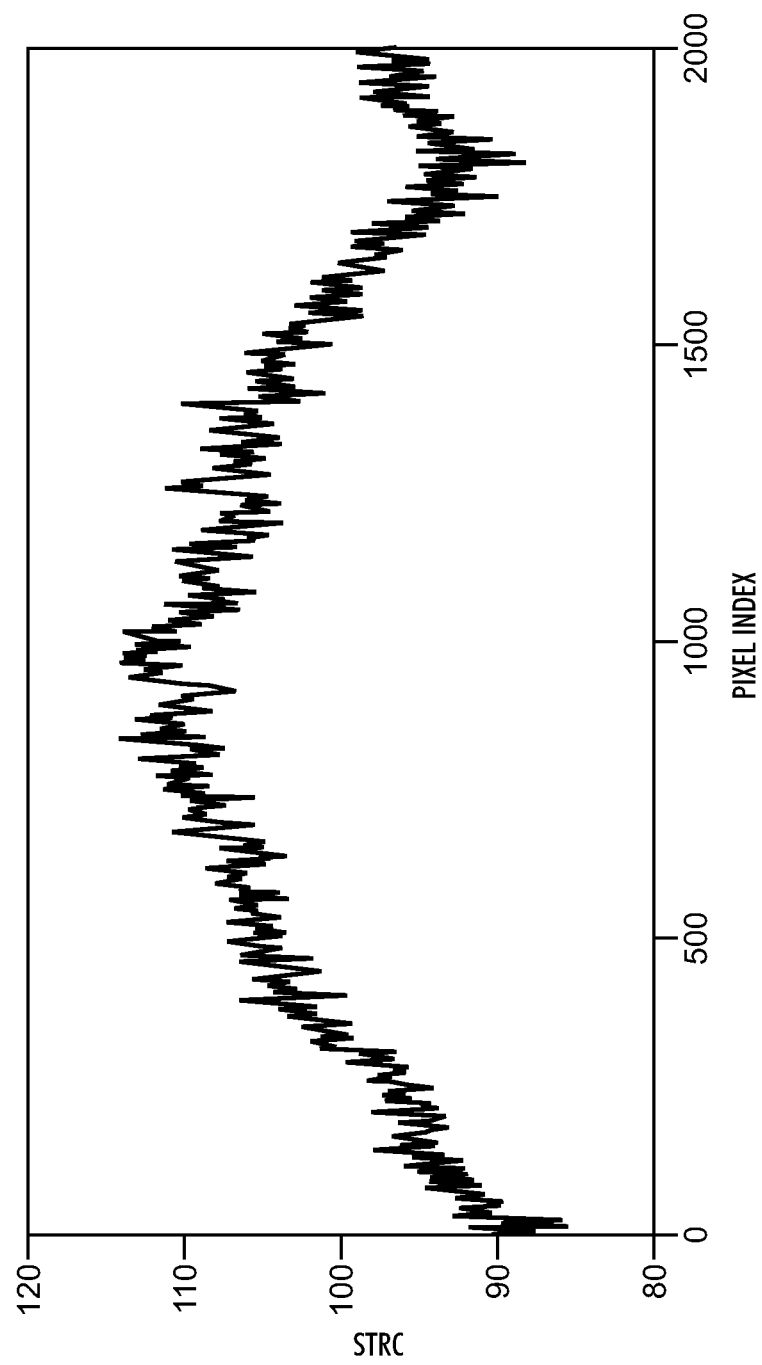
FIG. 3 illustrates the STRC correction values required to correct the profile of FIG. 1.

These considerations are illustrated in FIGS. 1-3. FIG. 1 illustrates a measured reflectance profile, showing large (widely spaced) inboard/outboard differential reflectively appearing as broad streaks on prints. The reflectance profile also includes high frequency (closely spaced) differential reflectivity of smaller magnitudes appearing as narrow streaks. FIG. 2 illustrates the result of correcting the print using only ROS actuation, which does not correct the narrow streaks as shown by the high frequency differential reflectivity that remains. FIG. 3 illustrates the result of correcting the print using only STRC actuation, showing that changes in contone values larger than 25 gray levels are needed to compensate for both the narrow and broad streaks. However, compensation of such a large magnitude (typically more than about 10 gray levels), can cause other undesirable image quality defects.

Though the STRC actuator may be able to mathematically correct the contone value of the digital image to most any value, large variations to the contone value within a small spatial region generates undesirable image artifacts. The disclosed systems and methods use a second actuator to correct for large low frequency streak defects by changing the development parameter, i.e., the laser ROS intensity, to control the developed toner mass, without modifying the contone value. The spatial variation of developed toner mass has been found to be a main cause of streaks.

Figure 6:
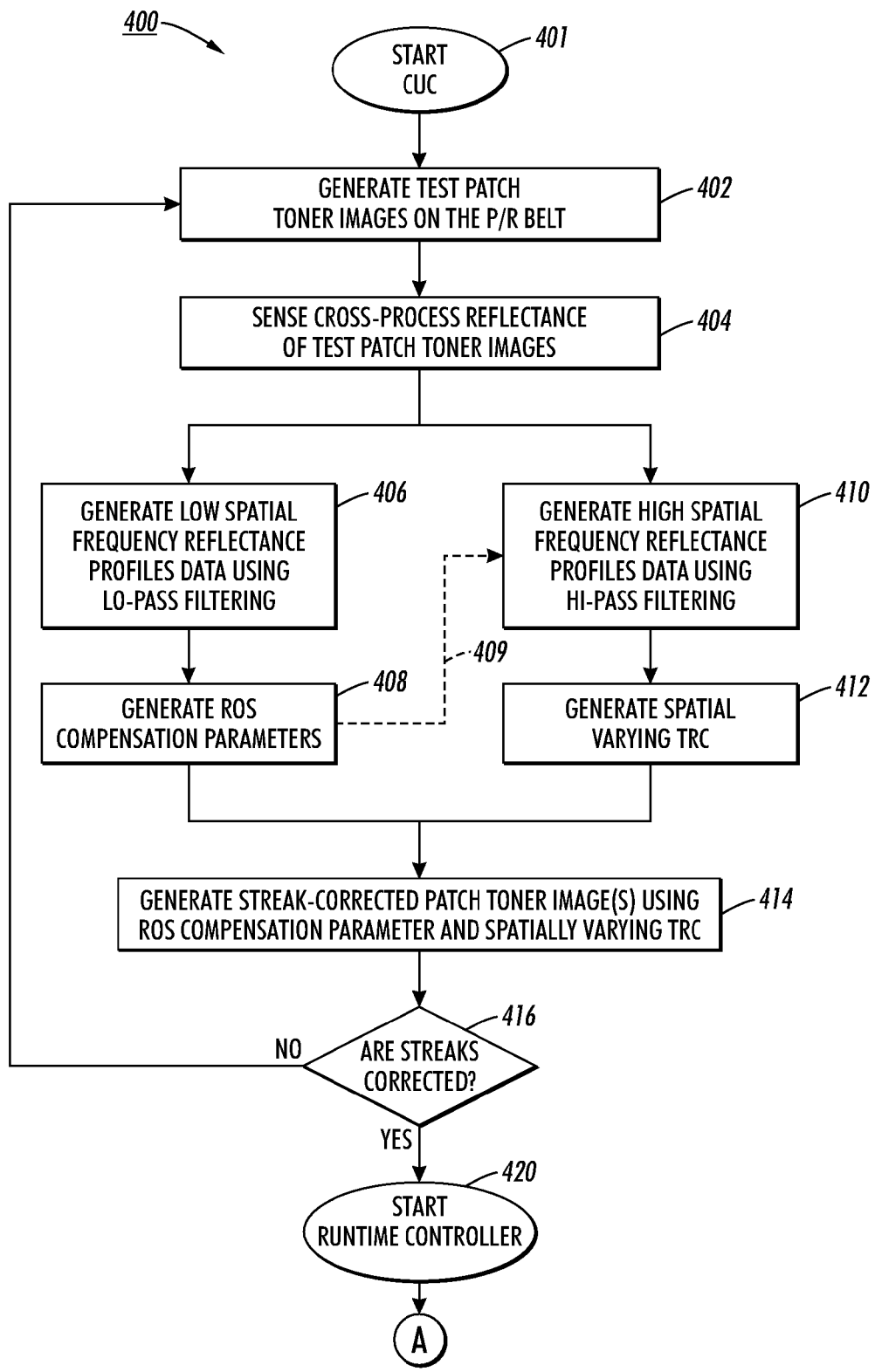
FIG. 6 illustrates a stage of a parallel process, occurring at machine start up, for correcting streak defects according to an exemplary embodiment of this disclosure.
Figure 7:
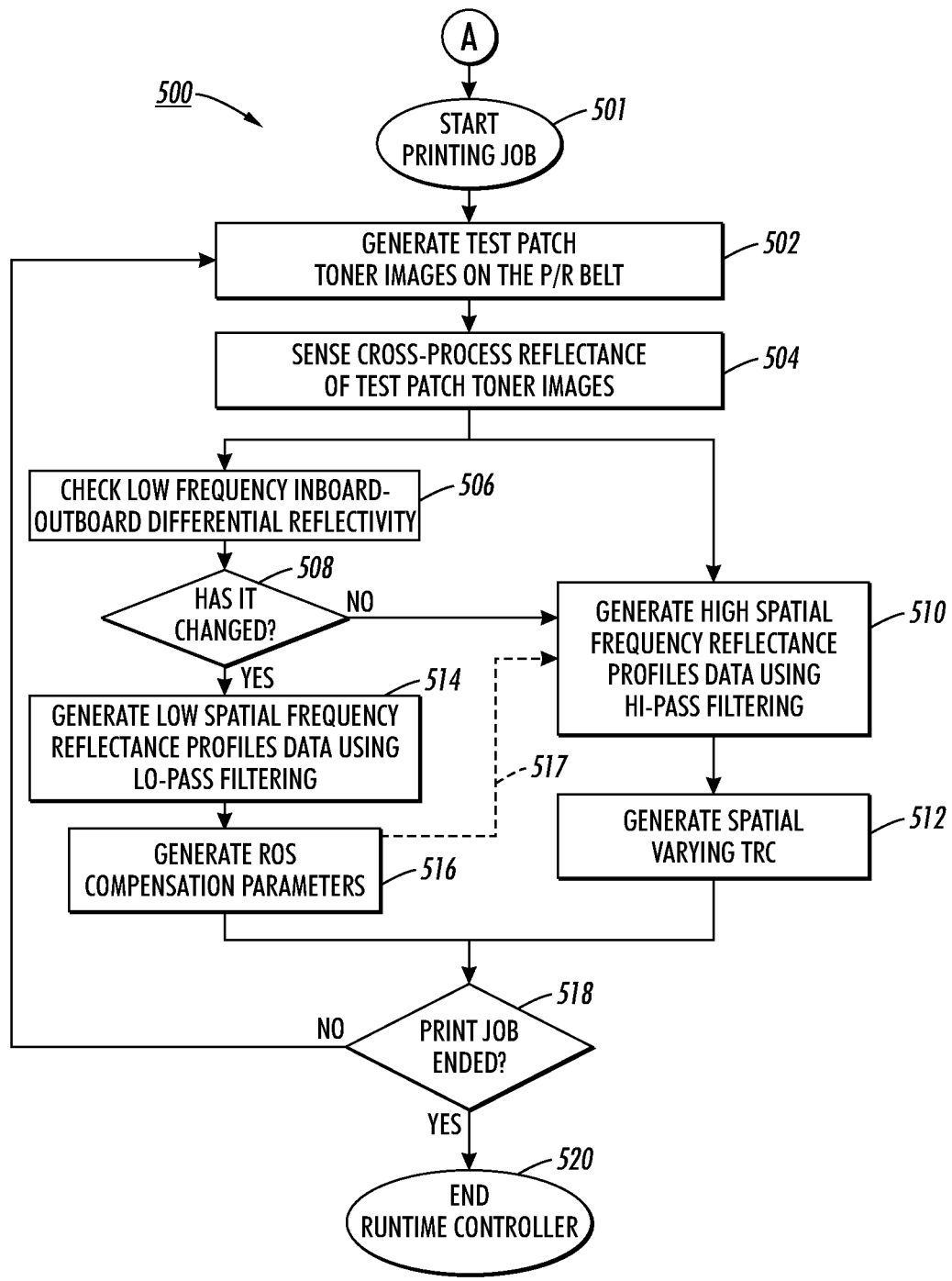
FIG. 7 illustrates a stage of the parallel process, occurring during machine runtime printing, for correcting streak defects according to an exemplary embodiment of this disclosure.

Referring now to FIGS. 5-7, an exemplary embodiment of a system and method utilizing a "parallel approach" of compensating for streak defects in images, including toner images and print images, formed by an image forming machine 8 is illustrated. ROS compensation parameter and STRC are generated in parallel, each using differently filtered image reflectance profile data as described in further detail below.

The method can include two stages of streak correction, operating sequentially. The first stage, illustrated generally at 400 in FIG. 6, occurs during machine startup mode, also known as cycle up or Cycle Up Conversion (CUC), and before runtime mode wherein the machine is ready for operation and during which print jobs are performed. The second stage, illustrated generally at 500 in FIG. 7, occurs during print jobs being performed at machine runtime. The first stage 400 is used to identify the system performance and generate the main streak correction actuators to be used at the start of the printing job. The second stage 500 is used to correct for variations in system performance during runtime and maintain image quality throughout the print job.

During the first stage 400, CUC is started at 401 and a first set of toner images, referred to as full width gray level test patches 316a, of approximately 1" length and full image width, are generated on the P/R belt 10 at 402 utilizing one or more of the image recording stations 16, 18, 20, 22, and 24 performing one or more charging 302, exposing 304 and developing 306 operations in manners similar to those described above. In the example provided, a set of 4 gray levels per color separation at different area coverages is considered However, it should be appreciated that a different number of first test patches 316a, usually between 4 and 32 test patches per color, may be used.

Figure 8:
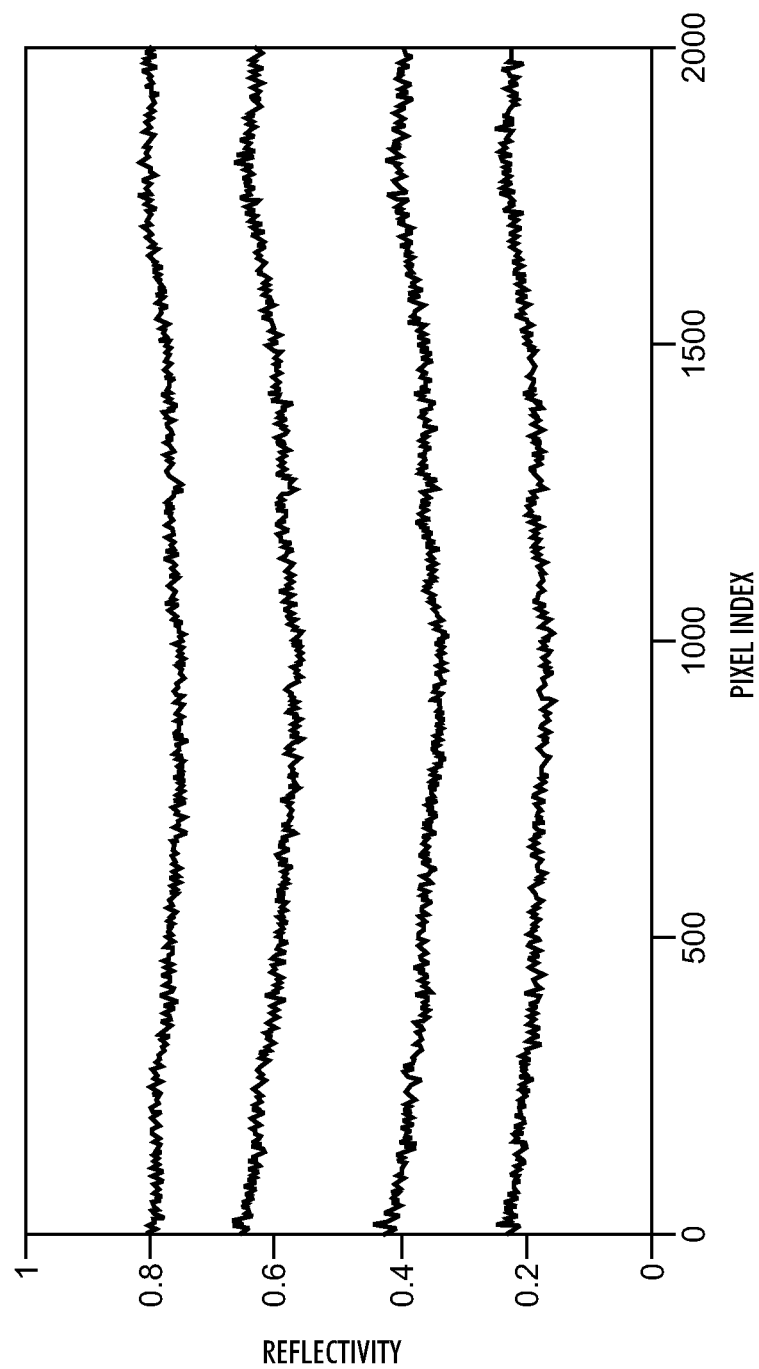
FIG. 8 shows the cross-process reflectance profile for 4 patches of a given color separation for 4 area coverages, provided by a test image illustrating visual color non-uniformities, or streaks.

Referring now to FIGS. 5 and 6, the cross-process reflectance of the first test patches 316a is sensed at an Input Image Module (IIM) 320 using the FWA Sensor 100 at 404. The sensor output is provided to a signal processing and control unit X2C 330 which processes the reflectance signal to generate reflectance profile data for the test patches 316a. An example reflectance profile for a single color separation is illustrated in FIG. 8 which shows large cross-process low spatial frequency non-uniformities having an inboard/outboard differential reflectivity of approximately 10% reflectivity, or about 25 gray levels as measured across the fast-scan direction. If perfect uniformity existed, the lines would be flat. The reflectance profile also shows high spatial frequency non-uniformities, i.e., narrow streaks, of approximately 2-4% reflectivity, or about 5-8 graylevels as measured across the fast-scan direction.

The sensor output is provided to a signal processing and control unit X2C 330 which processes the sensed reflectance data separating it into low spatial frequency data and high spatial frequency data.

Figure 9:
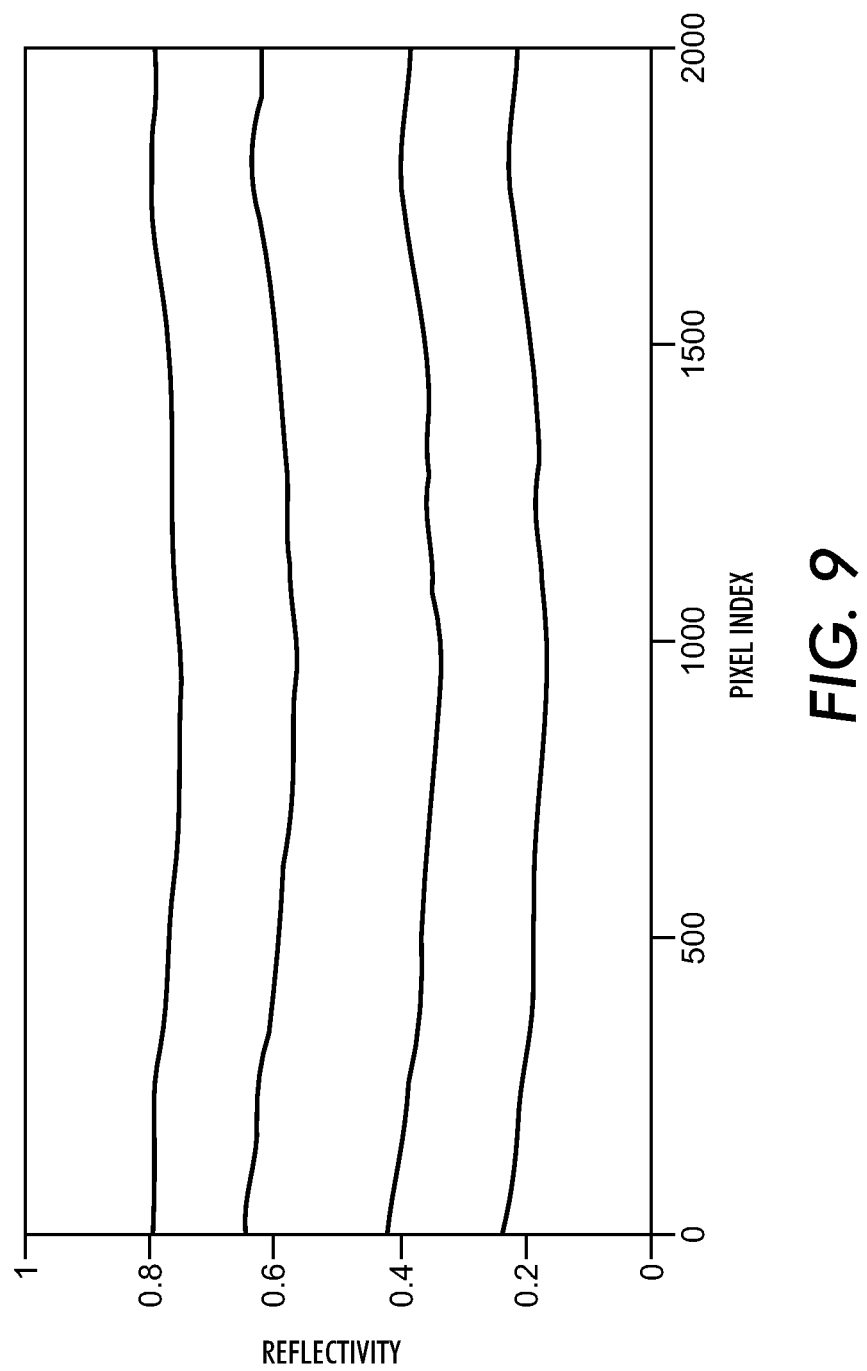
FIG. 9 illustrates the lo-pass filtered cross-process reflectance profiles corresponding to the profiles of FIG. 8.

In one example which should not be considered limiting, the signal processing and control unit X2C 330 generates low spatial frequency reflectance profile data by lo-pass spatial filtering the sensed reflectance data at 406. FIG. 9 illustrates the result of the lo-pass filter operation of 406 on the measured profiles of FIG. 8. The signal processing and control unit X2C 330 generates the ROS compensation parameter at 408 using a weighted average of the low spatial frequency reflectance profile data. The lo-pass filtered profiles are used as input to the signal processing and control unit X2C 330 controller to generate a laser ROS intensity correction table that makes adjustments to the intensity settings 324 for the illumination source, such as the laser, being actuated in the ROS device 28, 34, 40, 46 52 for the exposure operations 304. These intensity adjustments, referred to as ROS compensation parameter or low spatial frequency actuator table Rolloff Correction Curves (RCC), vary in amplitude as the ROS device scans along cross-process positions in the fast-scan direction in an amount needed to compensate for the non-uniformities which were being produced.

Figure 10:
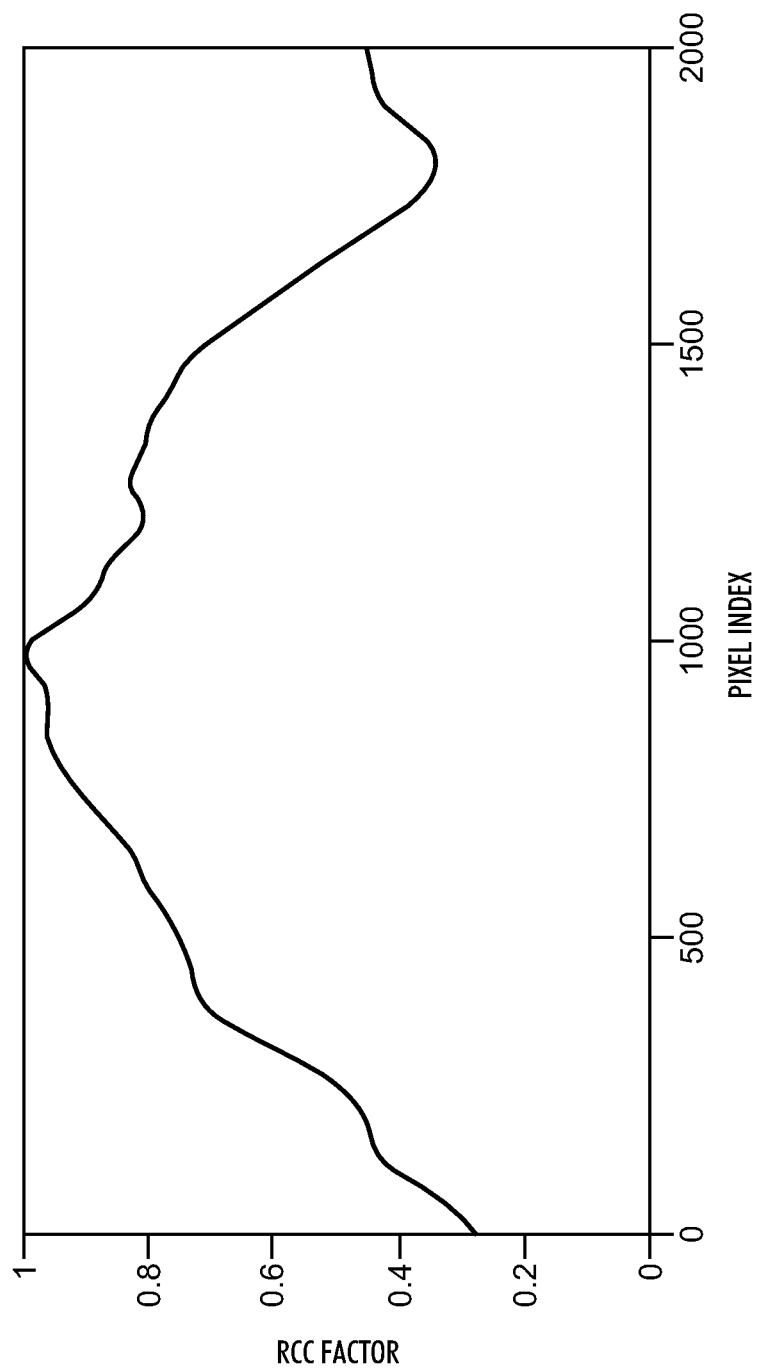
FIG. 10 illustrates an RCC correction factor per pixel calculated from the weighted average of the lo-pass filtered cross process reflectance profiles depicted in FIG. 9.

FIG. 10 illustrates the table of RCC values generated across the pixel index. The ROS compensation parameter can be generated using differences between the reflectance profile data sensed at 404 and desired uniform profiles as described in US Publication No. 2006/0001911 A1 for "Closed-loop compensation of streaks by ROS intensity variation" by Viassolo, et al., which is hereby incorporated herein by reference in its entirety. A single RCC table is typically used per color for all area coverages, therefore, the RCC values depicted in FIG. 10 is calculated as a weighted average of the values depicted in FIG. 9. Residual inboard/outboard non-uniformity present after the RCC ROS actuation can be removed using the second stage 500 as described below.

The ROS compensation parameter is loaded into a ROS Control Module (RCM) 340 for use in subsequent ROS actuations to produce streak-corrected images having a more uniform low frequency reflectance profile. The streak-corrected images can include toner images formed on the P/R belt 10 and print images ultimately generated therefrom.

Figure 11:
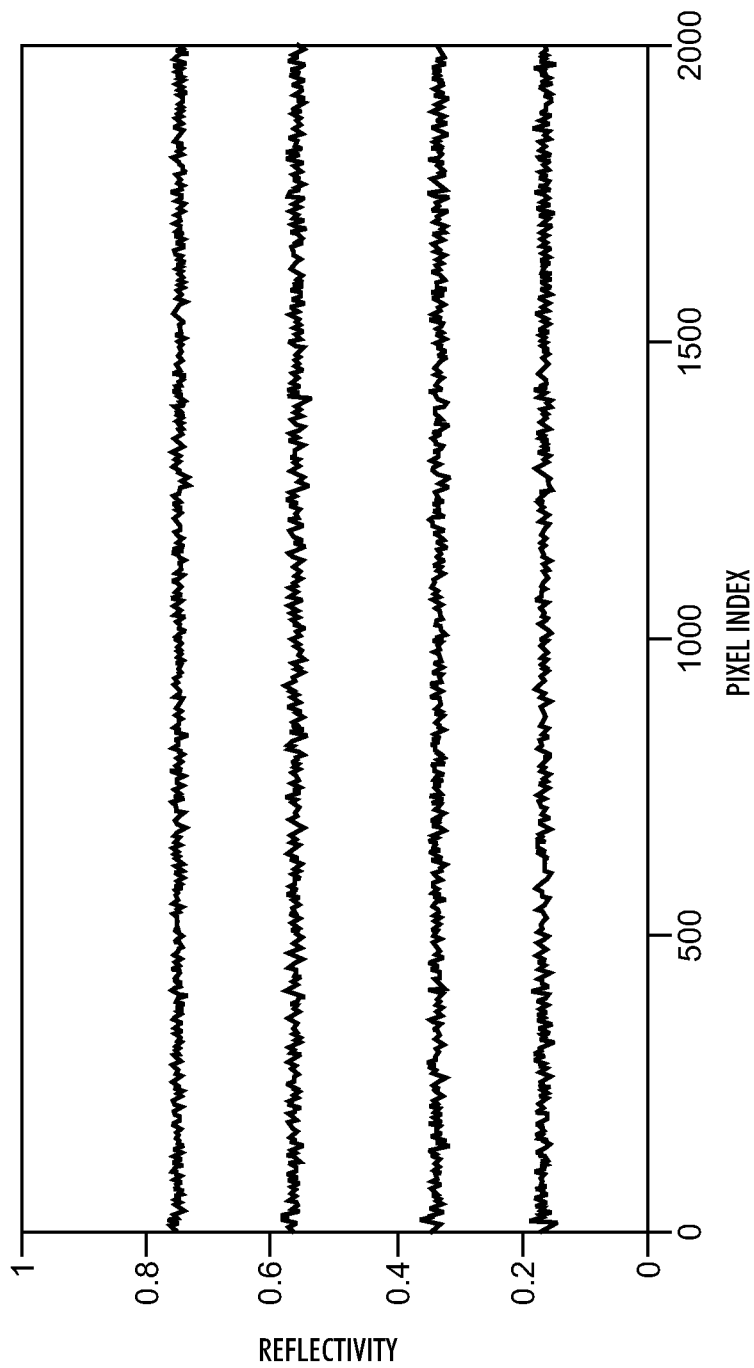
FIG. 11 illustrates hi-pass filtered cross-process reflectance profiles corresponding to the profiles of FIG. 8.
Figure 12:
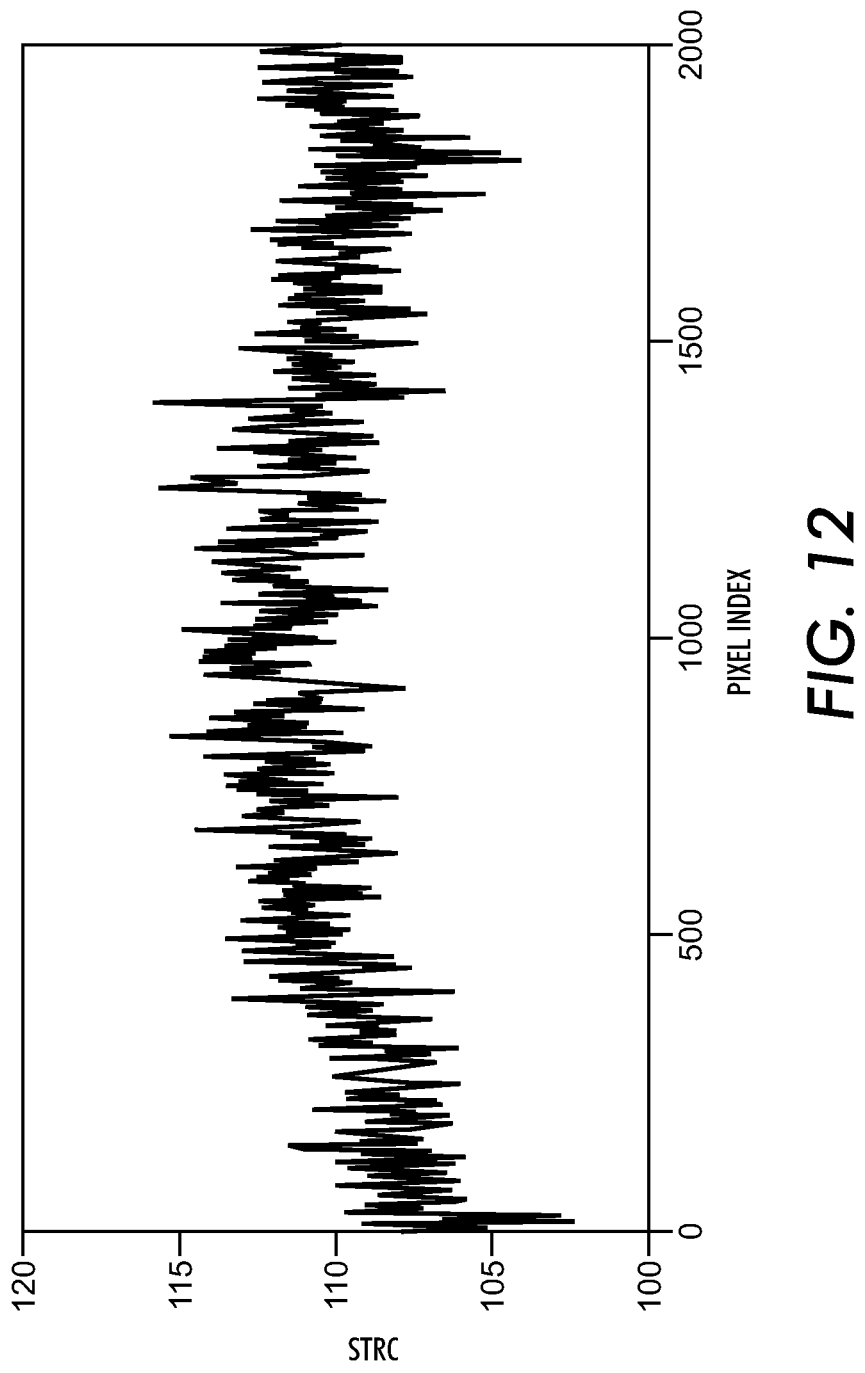
FIG. 12 illustrates one of the spatial TRC correction profiles corresponding to the profiles of FIG. 8.

The signal processing and control unit X2C 330 also generates high spatial frequency reflectance profile data by hi-pass spatial filtering the sensed reflectance profile data at 410. A simple and highly effective hi-pass spatial filter consists of the ROS compensation parameter table generated in 408, as indicated by the dotted arrow to 410. FIG. 11 illustrates the result of the hi-pass filter operation of 410 on the measured profiles of FIG. 8. The implementation limitation of a unique RCC for all area coverages causes the hi-pass filter operation to generate a smaller amount of inboard/outboard non-uniformities. This is because the magnitude of these inboard/outboard non-uniformities depends on area coverage. However, the residual magnitude of the inboard/outboard non-uniformity for all area coverages is small, after the filtering operation, and can be corrected by the STRC actuator without introducing image quality artifacts. The signal processing and control unit X2C 330 generates the spatially varying STRCs at 412 using the high spatial frequency reflectance profile data. FIG. 12 illustrates one of the spatial TRC correction profiles corresponding to the profiles of FIG. 8. One skilled in the art can appreciate the reduced range of contone correction values achieved with the disclosed systems and methods by comparing the STRC of FIG. 12 with the STRC shown in FIG. 3. Furthermore, this step corrects the residual low frequency inboard/outboard variation, apparent in FIG. 2, which would otherwise exist after implementing only the ROS actuation for streak correction as disclosed US Publication No. 2006/0001911 A1.

The STRCs are sent to a Contone Rendering Module (CRM) 350. The CRM uses the STRCs to modify the input image "contone" ("continuous tone") data, to derive compensated gray levels to correct the spatial non-uniformities, such as is taught by US Publication No. 2006/0077488 A1 for "Methods and systems achieving print uniformity using reduced memory or computational requirements" by Yeqing, et al., which is hereby incorporated herein by reference in its entirety.

The output of CRM 104 is used in a ROS interface module (RIM) 350 which reorganizes and synchronizes the binary image data for synchronous delivery to the ROS laser in cooperation with, for example, the motion of photoreceptor 10 as controlled by the ROS Control Module (RCM) 340.

The image path elements can be controlled by a marker I/O processor (MIOP) 354 which can provide timing signals and other control functions thereto. The xerographic image forming machine 8 can include other sensors for making charge adjustments 322 to the charging operation 302, intensity adjustments 324 to the ROS used in the exposure operation 304 and adjustments to $V_{MAG}$ made to the developing operation 306 for improving the consistency of the images formed on the P/R 10. Such sensors can include an infrared densitometer, such as an enhanced toner area coverage sensor (ETACS) 360, for measuring the gray level in the white space regions of a developed image on the P/R and an electrostatic voltmeter (ESV) 370 for measuring the potential on the P/R.

The STRCs are used to actuate the ROS during the exposure operation 304 to compensate for (or correct) the spatial non-uniformities (streaks) thereby producing streak-corrected toner images at 414. These toner images can be transferred to a substrate such as paper etc. to produce streak-corrected print images as described above.

The full process for correcting the streak defects can take one P/R belt revolution at CUC. However if it is determined, at 416, that the streaks are not sufficiently corrected, further iterations can be performed by repeating steps 402-414. Performing a plurality of iterations will typically use two or more P/R belt revolutions. The number of iterations used is determined by the quality of the residual-corrected reflectance profile being sought. More iterations may be used to produce quality prints, having residual streaks not larger than about 1 gray level, while most printing applications having acceptable amplitudes of about 2-3 gray levels will use fewer.

Once the CUC stage 400 is finished, the printer enters runtime mode and starts printing. Referring now to FIG. 7, the second stage 500 is used to correct for variations in system performance during runtime and maintain image quality. The print job is started at 501 and a second set of test patches 316b are generated at 502. The test patches 316b can be created on the P/R belt 10 within inter-print zones which are areas of the P/R belt 10 located between consecutive print job images. The print job images are ultimately transferred to consecutive media sheets, shown at 58 in FIG. 4, to form image prints. By utilizing inter-print zone patches 316b during runtime, the system and method of image correction described herein enables image non-uniformities to be reduced or eliminated during print jobs without interruption.

During runtime, test patches are generated in the IPZ of the P/R belt. In the example provided herein, the process direction dimension of the IPZ is about 1", and it usually contains no more than about 1 or 2 test patches. Because the IPZs are also used for other control tasks such as for example developing registration test targets, the test patches for streak correction are typically generated at a low frequency, for example, one out of every two or three IPZ is used for streak related targets (i.e., 33% or 50% Duty Cycle). The stability of the laser ROS may enable the update of the RCC tables to be performed at a much lower frequency. Nevertheless, the proposed procedure provides an integrated scheme for checking the performance of both RCC actuation and STRC actuation. As shown in FIG. 7, the cross-process reflectance of the test patches 316b is sensed at 504 and the low frequency inboard/outboard differential frequency is checked at 506. This step involves measuring the lo-pass, inboard/outboard differential reflectivity residual of the profiles sensed at 504, and deciding whether the magnitude is large enough to trigger the generation of a new RCC parameter table. If the residual low frequency reflectivity has changed, as determined at 508, the RCC table will be updated by generating low spatial frequency reflectance profile data through lo-pass filtering at 514 from the reflectance profile data sensed at 504 and generating the updated RCC table at 516 in manners similar to those described above.

High spatial frequency reflectance profile data is generated at 510 by hi-pass filtering the reflectance profile data sensed at 504 above. The procedure 510 is the same as the 410. For the case that the decision 508 triggers the generation of a new ROS compensation parameter table at 516, the new hi-pass filter is used at 510, as indicated by the dashed arrow between 516 and 510.

STRCs are generated at 512 and applied for generating streak-corrected images as described above. The ROS actuation and STRC actuation used during the printing job as shown in 500 provides further streak correction of image prints generated during the job. This correction can continue throughout the print job as shown at 518 until the print job is ended at 520.

The systems and method described herein correct cross-process non-uniformities by splitting actuation into two sub-systems, ROS actuation and STRC actuation thereby diminishing the extent of the correction provided for using only STRCs. The advantage over using only STRC streak correction is that the STRC correction will be of lower magnitude, thus, reducing artifacts such as contouring and preserving dynamic range in the image path for the customer images. Consider that there are only a fixed number of bits in the image path, such as 8-bits providing 256 levels. If 20 of these levels are used to compensate for a low frequency "smile" artifact, then up to 10% of the usable range is used just to perform this compensation. The ROS actuation is good for large amplitude corrections at low spatial frequencies for "average" area coverage; the actuation using STRCs is useful for small amplitude corrections at high and low spatial frequencies for coverage of all image areas.

The example depicted above describes a "parallel" approach, where the low spatial frequency large amplitude streak defects are corrected using modulation of the ROS laser, and high spatial frequency defects are corrected using the STRCs. This enables the STRC corrections to be made using lower amplitude corrections, on the order of only 5 gray levels or less, which avoids potential artifacts induced by larger STRC corrections.

One skilled in the art will appreciate that a single stage parallel approach to streak correction can also be performed using either first stage 400 or second stage 500 alone. After a print job is finished and the machine cycles down, the parameters for the stage 500 are kept in memory, and when the next print job is requested, the CUC step can be shortened by going directly into run time print mode and implementing stage 500 alone. On the other hand, if the machine performance is stable during a particular print job, a decision could be made to implement only stage 400.

Figure 13:
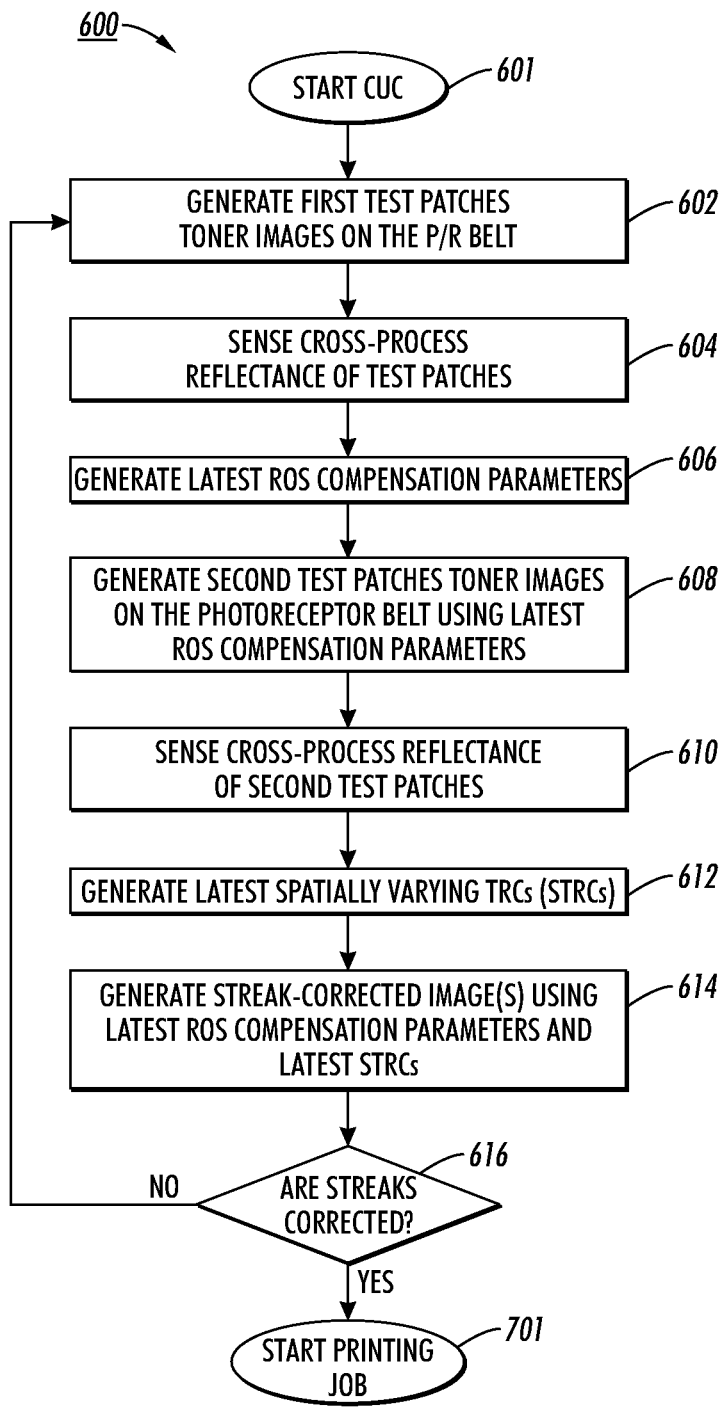
FIG. 13 illustrates another exemplary embodiment including a stage of a sequential process to correct low and high frequency streaks during machine startup.

Referring now to FIG. 13, a "sequential" approach shown generally at 600, provides an alternate embodiment to the "parallel" approach 400, 500 described above. The sequential approach 600 includes correcting low spatial frequency large amplitude streak defects using modulation of the ROS laser, and then correcting high spatial frequency defects using the STRCs.

During a first stage 600, CUC is started at 601 and a first set of full width gray level test patches 316a, similar to those described above, are generated on the P/R belt 10 at 602. The cross-process reflectance of the first test patches 316a is sensed at using the FWA Sensor 100 at 604.

The signal processing and control unit X2C 330 generates the ROS compensation parameter or low spatial frequency actuator table Rolloff Correction Curves (RCC) at 606. A second set of test patches are then generated on the P/R belt using the ROS compensation parameter at 608. If several iterations are performed, this parameter can be considered the latest ROS compensation parameter generated in the current iteration. The cross-process reflectance of the second test patches are sensed at 610 and this information is used to generate STRCs at 612. The STRCs can be considered to be the latest STRCs, produced in the current iteration if multiple iterations are used. Streak-corrected images are then generated using both the latest ROS compensation parameter and the latest STRCs at 614. If the streaks are not corrected to a desired level at 616, further iterations of steps 602-614 are performed. If the streaks are corrected at 616, the printing job is started at 701.

Figure 14:
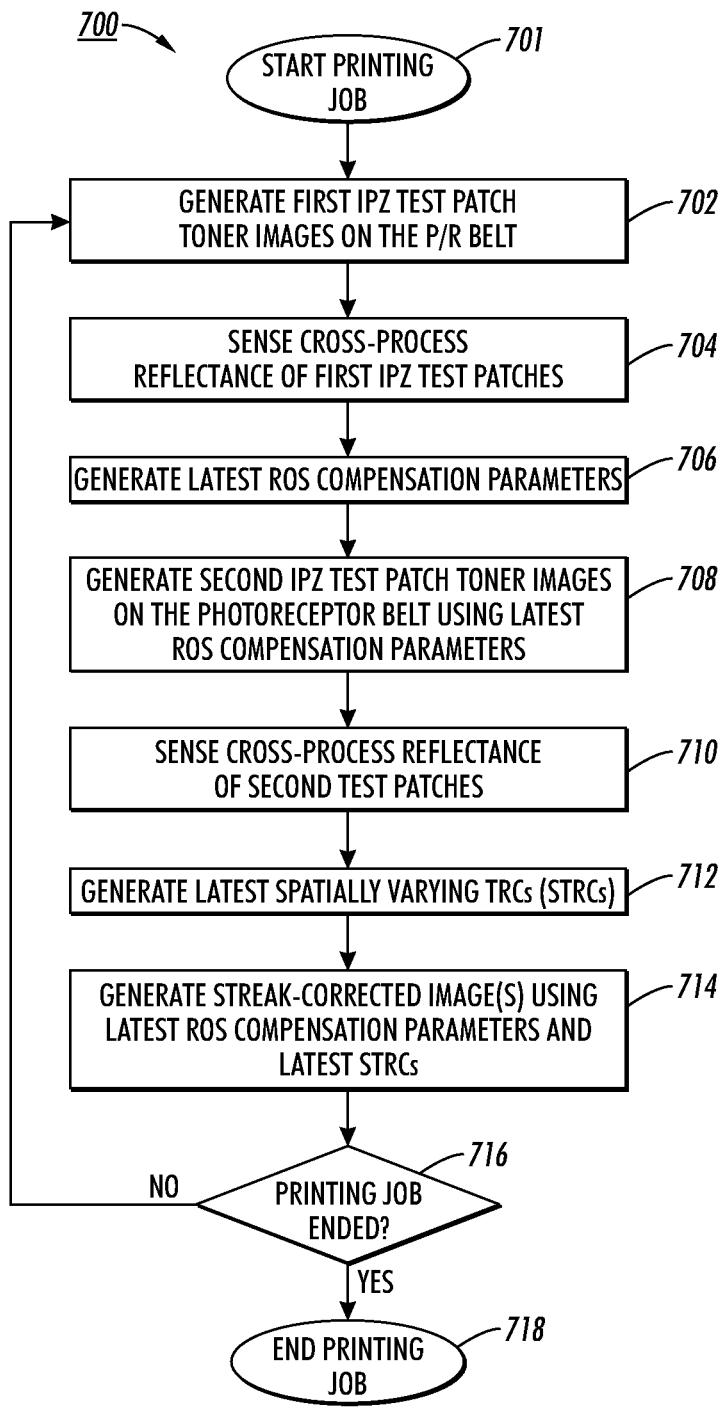
FIG. 14 illustrates a stage of the sequential process to correct low and high frequency streaks during machine runtime printing.

Referring now to FIG. 14, a second stage of the sequential approach, shown generally at 700, can be performed at runtime. The print job has started at 701 and a first set of full width gray level IPZ test patches 316b, similar to those described above, are generated on the P/R belt 10 at 702. The cross-process reflectance of these IPZ test patches 316b is sensed at 704.

ROS compensation parameter, or low spatial frequency actuator table Rolloff Correction Curves (RCC), is generated at 706 as described above. A second set of IPZ test patches 316b are then generated on the P/R 10 belt using the ROS compensation parameter at 708. The cross-process reflectance of the second test patches are sensed at 710 and this information is used to generate STRCs at 712. Streak-corrected images are then generated using both the latest ROS compensation parameter and the latest STRCs at 714. This second stage 700 can continue to run throughout the print job at determined at 716, until it is ended at 718.

One skilled in the art will appreciate that a single stage sequential approach to streak correction can also be performed using either first stage 600 or second stage 700 alone.

The sequential approach 600, 700 may achieve similar streak-correction results as the parallel approach 400, 500, but the number of P/R belt revolutions used, and thereby, the time expended at CUC will be longer.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for compensating for streak defects in images formed by a digital printer having a photoreceptor and a raster output scanner (ROS) device comprising:
   generating test images on the photoreceptor;
   sensing the cross-process reflectance of the test images on the photoreceptor;
   generating reflectance profile data of the test images using the sensed cross-process reflectance;

generating low spatial frequency reflectance profile data by low-pass spatial filtering the reflectance profile data;

generating high spatial frequency reflectance profile data by high-pass spatial filtering the reflectance profile data;

generating a ROS compensation parameter from the low spatial frequency reflectance profile data, the ROS compensation parameter varying in amplitude along cross-process positions in a fast-scan direction in an amount needed to compensate for non-uniformities;

generating a spatially varying Tone Reproduction Curve (STRC) from the high frequency reflectance profile data;

generating a streak-corrected image using the ROS compensation parameter and using the STRC to modify an input image contone data to derive compensated gray levels used for correcting spatial non-uniformities;

generating a first test image set on the photoreceptor;

generating first test image set reflectance profile data;

generating the ROS compensation parameter from differences between the generated first test image set reflectance profile data and a uniform cross process reflectance profile for the first image set;

generating a second test image set on the photoreceptor using the ROS compensation parameter;

generating second test image set reflectance profile data from the second test image set;

creating the STRC from differences between the generated second image set reflectance profile data and a uniform cross process reflectance profile for the second image set;

wherein the digital printer is a color image forming machine using a plurality of separate color channels;

generating the first image set by developing first full width test patches including separate gray level patches for each color channel; and generating the second image set by developing second full width test patches including separate gray level patches for each color channel.

2. The method of claim 1 further comprising:

performing subsequent iterations by repeating the generating and creating steps to further reduce streaks.

3. The method of claim 1 further comprising generating the ROS compensation parameter and generating the STRC during start up mode prior to runtime mode.

4. The method of claim 3 further comprising:

generating a runtime ROS compensation parameter from the low spatial frequency reflectance profile data during a print job performed during runtime mode;

generating a runtime spatially varying Tone Reproduction Curve (STRC) from the high spatial frequency reflectance profile data during the print job; and generating a streak-corrected image using the runtime STRC and the runtime ROS compensation parameter generated during the print job.

5. The method of claim 1 further comprising generating the ROS compensation parameter and generating the STRC during a print job performed during runtime mode.

6. The method of claim 1 further comprising:

generating the ROS compensation parameter from differences between the low spatial frequency reflectance profile data and a uniform cross process reflectance profile; and generating the STRC from differences between the high spatial frequency reflectance profile data and a uniform cross process reflectance profile.

7. The method of claim 6 further comprising generating the ROS compensation parameter and generating the STRC during start up mode prior to runtime mode.

8. The method of claim 7 further comprising:

generating a runtime ROS compensation parameter from the low spatial frequency reflectance profile data during a print job performed during runtime mode;

generating a runtime spatially varying Tone Reproduction Curve (STRC) from the high spatial frequency reflectance profile data during the print job; and generating a streak-corrected image using the runtime STRC and the runtime ROS compensation parameter generated during the print job.

9. The method of claim 6 further comprising generating the ROS compensation parameter and generating the STRC during a print job performed during runtime mode.

10. The method of claim 6 wherein the generating the ROS compensation parameter includes using a weighted average of the low spatial frequency reflectance profile data.

11. The method of claim 6 wherein the generating the high spatial frequency reflectance profile data by high-pass spatial filtering the reflectance profile data using the ROS compensation parameter.

12. A system for compensating for streak defects in images formed by an image forming device having a photoreceptor and a raster output scanning device, the system comprising:

a scanner for sensing the cross-process reflectance of test images formed on the photoreceptor generating sensed reflectance data; and a controller generating low spatial frequency reflectance profile data by low-pass spatial filtering the sensed reflectance data and generating high spatial frequency reflectance profile data by high-pass spatial filtering the sensed reflectance data, wherein the controller generates a ROS compensation parameter using the low spatial frequency reflectance profile data, the ROS compensation parameter varying in amplitude along cross-process positions in a fast-scan direction in an amount needed to compensate for non-uniformities in generating a streak-corrected image, and wherein the controller generates a spatially varying Tone Reproduction Curve (STRC) using the high spatial frequency reflectance profile data for use in generating the streak-corrected image;

generating a first test image set on the photoreceptor;

generating first test image set reflectance profile data;

generating the ROS compensation parameter from differences between the generated first test image set reflectance profile data and a uniform cross process reflectance profile for the first image set;

generating a second test image set on the photoreceptor using the ROS compensation parameter;

generating second test image set reflectance profile data from the second test image set;

creating the STRC from differences between the generated second image set reflectance profile data and a uniform cross process reflectance profile for the second image set;

wherein the image forming device is a color image forming machine using a plurality of separate color channels;

generating the first image set by developing first full width test patches including separate gray level patches for each color channel; and generating the second image set by developing second full width test patches including separate gray level patches for each color channel.

13. The system of claim 12 further comprising:
the controller generating the ROS compensation parameter from differences between the low spatial frequency reflectance profile data and a uniform cross-process reflectance profile and generating the STRC from differences between the high spatial frequency reflectance profile data and a uniform cross-process reflectance profile.

14. The system of claim 13 wherein the controller uses a weighted average of the low spatial frequency reflectance profile data for generating the ROS compensation parameter.

15. The system of claim 13 wherein the controller generates the high spatial frequency reflectance profile data by high-pass spatial filtering the reflectance profile data using the ROS compensation parameter.

16. The system of claim 12 further comprising the controller generating the ROS compensation parameter and STRC during start up mode prior to runtime mode.

17. The system of claim 12 further comprising the controller generating the ROS compensation parameter and STRC during a print job performed during runtime mode.

18. A digital printer comprising a photoreceptor;
a raster output scanning (ROS) device for forming an image on the photoreceptor;
a scanner for sensing the cross-process reflectance of test images formed on the photoreceptor generating sensed reflectance data;
a controller generating low spatial frequency reflectance profile data by low-pass spatial filtering the sensed reflectance data and generating high spatial frequency reflectance profile data by high-pass spatial filtering the sensed reflectance data, wherein the controller generates a ROS compensation parameter using the low spatial frequency reflectance profile data, the ROS compensation parameter varying in amplitude along cross-process positions in a fast-scan direction in an amount needed to compensate for non-uniformities in generating a streak-corrected image, and wherein the controller generates a spatially varying Tone Reproduction Curve (STRC) using the high spatial frequency reflectance profile data;
a ROS Control Module producing streak-corrected images using the compensation parameter
a Contone Rendering Module deriving compensated gray levels using the STRC for use in generating the streak-corrected image;
the controller further generating first test image set reflectance profile data;
generating the ROS compensation parameter from differences between the generated first test image set reflectance profile data and a uniform cross process reflectance profile for the first image set;
generating a second test image set on the photoreceptor using the ROS compensation parameter;
generating second test image set reflectance profile data from the second test image set;
creating the STRC from differences between the generated second image set reflectance profile data and a uniform cross process reflectance profile for the second image set;
wherein the digital printer is a color image forming machine using a plurality of separate color channels;
generating the first image set by developing first full width test patches including separate gray level patches for each color channel; and
generating the second image set by developing second full width test patches including separate gray level patches for each color channel.

19. The digital printer of claim 18 further comprising the controller generating the ROS compensation parameter from differences between the low spatial frequency reflectance profile data and a uniform cross-process reflectance profile and generating the STRC from differences between the high spatial frequency reflectance profile data and a uniform cross-process reflectance profile.

20. The digital printer of claim 19 wherein the controller uses a weighted average of the low spatial frequency reflectance profile data for generating the ROS compensation parameter.

21. The digital printer of claim 19 wherein the controller generates the high spatial frequency reflectance profile data by high-pass spatial filtering the reflectance profile data using the ROS compensation parameter.

* * * * *